US012743721B2

(12) United States Patent
Gmajnic et al.

(10) Patent No.: US 12,743,721 B2
(45) Date of Patent: Sep. 22, 2026

(54) DEVICE FOR AIDING VISUALLY IMPAIRED OR BLIND PERSONS WHILE SHOPPING

(71) Applicant: VusionGroup GmbH, Fernitz-Mellach (AT)

(72) Inventors: Nikola Gmajnic, Fernitz-Mellach (AT); Philipp Jauck, Fernitz-Mellach (AT)

(73) Assignee: VusionGroup GmbH, Fernitz-Mellach (AT)

( * ) Notice: Subject to any disclaimer, the term of this patent is extended or adjusted under 35 U.S.C. 154(b) by 170 days.

(21) Appl. No.: 18/709,899

(22) PCT Filed: Dec. 18, 2021

(86) PCT No.: PCT/EP2021/086677
§ 371 (c)(1),
(2) Date: May 14, 2024

(87) PCT Pub. No.: WO2023/110139
PCT Pub. Date: Jun. 22, 2023

(65) Prior Publication Data
US 2025/0014091 A1 Jan. 9, 2025

(51) Int. Cl.
*G06Q 30/0601* (2023.01)
*G06Q 30/015* (2023.01)
(Continued)

(52) U.S. Cl.
CPC ....... *G06Q 30/0641* (2013.01); *G06Q 30/015* (2023.01); *G09B 21/001* (2013.01);
(Continued)

(58) Field of Classification Search
CPC ....... G06Q 30/01; G06Q 30/015; H04W 4/80; H04M 1/72481; G09B 21/001; G10L 13/02; G09F 3/208
(Continued)

(56) References Cited

U.S. PATENT DOCUMENTS

2014/0156367 A1* 6/2014 Aihara ............... G06Q 30/0214 705/14.16
2014/0316944 A1* 10/2014 Kim ....................... G06Q 10/30 705/26.61
(Continued)

FOREIGN PATENT DOCUMENTS

JP 2015-170255 A 9/2015
JP 2016-143078 A 8/2016
KR 10-2014-0126845 A 11/2014

OTHER PUBLICATIONS

Machine Translation of Yoichiro et al. (JP 2014-170255 A), "Electronic Shelf Tag and Electronic Shelf Tag System", pp. 1-34 (Year: 2015).*
(Continued)

*Primary Examiner* — Paultep Savusdiphol
(74) *Attorney, Agent, or Firm* — Studebaker Brackett PLLC

(57) ABSTRACT

Electronic price and/or product-information display device, display device for short, which is designed to visually reproduce price and/or product information of a product and which is designed to store reproduction data, said reproduction data representing the price and/or product information, wherein the display device comprises a first short-range communication device, in particular, a first near-field communication device, NFC device for short, which is designed for wireless short-range communication with a reproduction device, in particular, a reproduction device which is NFC-compatible, wherein the reproduction data comprises display-reproduction data which is determined in order to visually reproduce the price and/or product information by means of the electronic price and/or product display device itself, and output reproduction data, which allows an output to the reproduction device by means of wireless short-range communication and the acoustic reproduction of the price
(Continued)

and/or product information at the reproduction device, in particular, in the form of audio and/or text reproduction data, and that the short-range communication device has access to the output reproduction data and is designed to output the output reproduction data in the course of wireless short-range communication.

19 Claims, 2 Drawing Sheets

(51) Int. Cl.

| | |
|---|---|
| ***G09B 21/00*** | (2006.01) |
| ***G10L 13/02*** | (2013.01) |
| ***H04M 1/72481*** | (2021.01) |
| ***H04W 4/80*** | (2018.01) |

(52) U.S. Cl.
CPC ......... *G10L 13/02* (2013.01); *H04M 1/72481* (2021.01); *H04W 4/80* (2018.02)

(58) Field of Classification Search
USPC .......................................................... 235/383
See application file for complete search history.

(56) References Cited

U.S. PATENT DOCUMENTS

2015/0099946 A1 4/2015 Sahin
2016/0189567 A1* 6/2016 Bradley ............... G09B 21/006 704/271

OTHER PUBLICATIONS

International Search Report issued in PCT/EP2021/086677; mailed Jul. 11, 2022.

"Notice of Reasons for Refusal" Office Action issued in JP 2024-529145; mailed by the Japanese Patent Office on Jul. 30, 2025.

Notification pursuant to Article 94(3) EPC issued by the European Patent Office on Oct. 21, 2025 , which corresponds to European Patent Application No. 21840912.6-1218 and is related to U.S. Appl. No. 18/709,899.

* cited by examiner

DEVICE FOR AIDING VISUALLY IMPAIRED OR BLIND PERSONS WHILE SHOPPING

TECHNICAL FIELD

The invention relates to a device for aiding visually impaired or blind persons while shopping.

BACKGROUND

On business premises nowadays, product and/or price information is presented on electronic display units, particularly electronic shelf labels, known in technical jargon as ESLs for short. The visual perception of this information is an enormous challenge for visually impaired people and is impossible for blind persons.

Nowadays, highly sophisticated, relatively expensive special devices are commercially available, such as a device developed by the company "OrCam Technologies Ltd." for example, which is marketed under the product name "OrCam MyEye" (https://www.orcam.com/en/myeye2/) (see also the published European patent application EP 2 490 155 A1). They convert optically captured images into text that is read aloud to the user of the special device.

However, people with visual impairments are often economically disadvantaged, which can make the purchase of such special equipment difficult or even impossible. In addition, the handling of an additional special device for this group of people is in itself an undesirable additional everyday challenge.

The object of the invention is therefore to provide an intuitively applicable solution for the everyday shopping of visually impaired or blind persons, which does not require the purchase, handling and maintenance of a special device.

SUMMARY OF THE INVENTION

This task is solved by means of a device according to Claim 1. The object of the invention therefore relates to an electronic price and/or product-information display device, display device for short, which is designed to visually reproduce price and/or product information of a product and which is designed to store reproduction data, said reproduction data representing the price and/or product information, wherein the display device comprises a first short-range communication device, in particular, a first near-field communication device, NFC device for short, which is designed for wireless short-range communication with a reproduction device, in particular, a reproduction device which is NFC-compatible, characterized in that the reproduction data comprises display-reproduction data which is determined in order to visually reproduce the price and/or product information by means of the electronic price and/or product display device itself, and output reproduction data, which allows an output to the reproduction device by means of wireless short-range communication and the acoustic reproduction of the price and/or product information at the reproduction device and that the short-range communication device has access to the output reproduction data and is designed to output the output reproduction data in the course of wireless short-range communication.

This task is also solved by means of a reproduction device according to Claim 8. The invention therefore relates to a reproduction device which has: a reproduction stage designed for the acoustic reproduction of digitally represented information, characterized in that a second short-range communication device is provided, in particular, a second near-field communication device, NFC for short, which is designed for wireless short-range communication with an electronic price and/or product-information display device, in particular, one which is NFC-compatible, display device for short, and the second short-range communication device is designed for querying and receiving output reproduction data in the course of wireless short-range communication with the electronic price and/or product display device, wherein the output reproduction data in the reproduction device allows the acoustic reproduction of the price and/or product information, and the second short-range communication device is designed to provide the output reproduction data, in particular, in the form of audio and/or text reproduction data, for the acoustic reproduction of the price and/or product information via the reproduction stage.

The advantages of the measures according to the invention are that the audio information required for blind or visually impaired persons to identify a product is made available with significantly less effort than with the known special devices. This means that the time-consuming process of image capture of a product, image evaluation up to the recognition of text in the recorded image and the generation of audio information from the recognized text is dispensed with. This process requires, at a disadvantage, that the person holds the product in his hands or is at least able to align the appearance of the special device with the product to be detected. The risk of incorrect recognition of image content, such as a fundamental recognition error or a focus on an irrelevant image area of the captured image, which always exists in the context of computerized image evaluation, is also completely ruled out due to image recognition or image evaluation as such being completely dispensed with. On the contrary, the reproduction data required for acoustic reproduction in the reproduction device is obtained directly from the display device. Therefore, in a system of electronic price and/or product-information display device s, also known in technical jargon as an "electronic shelf label system", an ESL system for short, in which there is a known assignment to products for the display devices, no incorrect provision of the information required for acoustic reproduction can occur.

The information relevant to a visually impaired or blind person about a product is therefore retrieved directly from the display device, wherein only a commercially available reproduction device, such as a smartphone or a tablet computer, has to be brought into the radio range, i.e., in the vicinity of the display device. This conventionally available device only requires a communication device that is compatible with the first short-range communication device. As soon as the wireless short-range communication has been established, the reproduction data can be received with the aid of an application, i.e., software that is processed on the reproduction device, and the price and/or product information transported or referenced with it is acoustically reproduced by the reproduction device, particularly immediately—i.e., virtually without delay.

In this manner, the person can focus on locating display devices in the store, which are usually placed at the front of a shelf. This dramatically simplifies the shopping process, also particularly for blind persons, who only have to feel along the shelving rail to find a display device. Whether there is actually a product there or whether it is out of stock is still irrelevant at this point in the search and finding of the display device, since the availability information for the affected product, for example, the number of products still on the shelf or the absence of the product on the shelf, can also be provided with the aid of the output reproduction data.

The output reproduction data can be made up exclusively of user data, but it is preferable to be embedded in or generally combined with control data that are common in terms of communication technology. This means that they are usually transferred with this control or control-system data. It should also be noted that the output reproduction data can be in two different data structures or comprise two different data structures.

As a first data structure, a reference can be used, which enables the reproduction device to access the information represented by the reproduction data, in particular, text and/or audio reproduction data, within the local data network of the business premises, for example, via a customer WLAN, or via the Internet, and to acoustically reproduce the information transmitted by it.

As a second data structure, audio and/or text reproduction data encoded in a common data format can be used so that the reproduction device can acoustically reproduce the information directly transmitted by it. Where applicable, the second data structure can be compressed in order to make optimal use of the available bandwidth of wireless short-range communication. Particularly in the case of NFC radio communication, it can be favourable to limit the second data structure to text reproduction data, because this is where the lowest data volume is to be expected.

Optionally, a combination of the first and second data structure can also be used. This means, for example, that the description of the product can be initiated with a second data structure (audio or text reproduction data) that can be played immediately or directly at the reproduction device, because the acoustic reproduction of this information takes time, while, in the background, supplementary data is loaded from a server via the business WLAN or the Internet with the aid of the first data structure (e.g., a reference) and after the reproduction of the information provided by the audio or text reproduction data starts the reproduction of the referenced information, which can also be much more extensive than that provided by the second data structure.

Depending on the implementation of the invention, a Bluetooth low-energy radio communication device with a short range (e.g., max. 50 cm or less up to a few cm) or also a radio communication device that enables radio communication over a few cm (approx. 4 cm or less) in accordance with near-field communication specifications (ISO/IEC 18092, ECMA 340 and/or ISO/IEC 21481/ECMA 352) can be used for the short-range communication device. Both wireless technologies can also be used together in the display device in order to also be prepared for situations in which reproduction devices are used which support only one or the other technology.

For their part, the reproduction devices commonly used today (smartphones and tablet computers) are usually equipped on the hardware side for the use of NFC technology and require, as an adaptation, the availability of the received reproduction data or the data referenced by it for the reproduction stage of the reproduction device that carries out the audio output of the information contained and intended for acoustic reproduction.

Therefore, in summary, a solution is provided for the everyday shopping of visually impaired or blind persons, in which, on the one hand, the information to be reproduced acoustically or a reference to it is provided by the operator of a system of display devices in a shop in a location-specific manner on site of the respective display device and, on the other hand, commercially available reproduction devices on the customer side are used, which have already been widely distributed and whose handling is also part of everyday life for visually impaired or even blind persons. Typical examples of reproduction devices already mentioned here can usually even be controlled via voice commands or within the scope of human-machine dialogue.

Further, particularly favourable embodiments and further embodiments of the invention result from the dependent claims as well as the following description.

The invention discussed here is mainly applied in the context of an ESL system. In such a system, there are a plurality of such display devices, i.e., ESLs, in order to visualize price and/or product information for a presented product or product group.

Such ESLs can be attached to shelves or their shelving rails. The fastening structure on which the ESLs and the product are located can therefore be designed as a shelf or as a shelf level. It can also be attached to a presentation table. The fastening structure can therefore also be designed as a table. Such ESLs can also be designed as a display sign to be placed on a table. Such a display device can also be designed as a pendant for attachment to clothing. The fastening structure can therefore also be designed as a connecting link between the electronic display device and the product. Such a fastening structure can also be implemented, for example, as a stitching thread, needle or similar. Due to the simplified discussion of the invention, an ESL attached to a shelf, specifically its shelving rail, will always be discussed in the following with regard to the display device.

For the purpose of visualizing information, each ESL comprises a screen, which is usually implemented as an electrophoretic screen in order to enable the most energy-efficient operation of battery-powered ESLs. However, other types of screens, such as LCD screens or similar for example, can also be used. The ESLs can also be supplied in an electrically wired manner and/or on a technological communications level. The power supply can also be provided by means of a cable structure integrated into the shelving rail, wherein the supply lines are contacted by means of contacts of the ESL. An electrical supply can also be provided by means of radio signals, which is known in technical jargon as "Power over WIFI".

In a radio-based ESL system, there are also a plurality of access points that form an ESL radio network for the communication technology supply of the ESLs in order to send addressed data to the ESLs or to retrieve addressed data from the ESLs. Usually, a group of ESLs is each assigned to an access point and can be addressed via it. The assignment works by selecting a suitable radio channel in the ISM band used by the respective access point and registering the ESL in question with the access point responsible for it. For radio communication, an essentially standardized radio protocol, such as ZigBee® or Bluetooth® for example, can be used. A proprietary radio protocol, such as the one disclosed in WO 2015/124197 A1, can also be used.

The access points, for their part, are typically wired to a central control device, such as a local server for example, on which a software application (such as shop management software) is run for managing and controlling the ESLs, or can also be controlled via a cloud-based software application, which provides the aforementioned functionality for managing and controlling the ESLs.

However, the display device can also be designed as a so-called video shelving rail, wherein a high-resolution screen is typically used to display video content. This video shelving rail can be attached to a shelving rail or replace the shelving rail. In the case of an embodiment as a video shelving rail, the supply of electrical power to the display device, like the communication technology supply, is usually wired. In the case of the video shelving rail, it usually extends along a group of products. The price and/or product information made available by means of the output reproduction data may relate to the entirety of the products assigned to the video shelving rail. In this case, the information content can include the quantity of different products, their arrangement along the video shelving rail as well as their geographical findability along the video shelving rail so that a complete acoustically guided orientation of the visually impaired or even blind person is made possible.

As mentioned, the display device is a component of an ESL system. In such an ESL system, the display devices communicate with a central control device, which can be formed by a central server or by cloud-based software, obtaining the data intended for the display of price and/or product information. For this purpose, the display device comprises a system communication device which is different from the short-range communication device and is which is determined in order to communicate with the control device used to provide the reproduction data. Favourably, the output reproduction data was obtained by means of the system communication device and is stored in a storage stage of the display device. Stored there, they are available for immediate use, i.e., for direct output by the display device and subsequently for processing by the reproduction device.

The acoustic reproduction of the information content concerned by means of the output reproduction data can be carried out in two ways in the case of the reproduction device. The reproduction stage can be designed for direct reproduction of audio reproduction data represented by the output reproduction data. This allows one or a plurality of audio files to be made available using the output reproduction data, which would be preferable for wireless short-range communication if there is sufficient bandwidth. On the other hand, it can also be provided that the reproduction device is designed to convert text reproduction data represented by the output reproduction data into audio reproduction data and that the reproduction stage is designed to directly reproduce the audio reproduction data thus obtained. This would be preferable if only a very limited bandwidth is available for wireless short-range communication. In this case, very compact text files with as little data volume as possible can be transmitted, which are synthesized into speech by the reproduction device using known software methods and only then are they reproduced acoustically.

In principle, the output reproduction data can be submitted immediately after a connection has been established with the reproduction device. However, since other devices could or should also be able to use the short-range communication device, it has been shown to be favourable that the display device is designed to detect a output-reproduction-data query command that can be received in the course of wireless short-range communication, and, where applicable, to also distinguish it from at least one other query command, and to distinguish the output reproduction data only after the output-reproduction-data query command has been detected by means of the wireless short-range communication. Accordingly, the reproduction device is preferably designed to output an output-reproduction-data query command via the second short-range communication device for the purpose of initiating the reception of the audio and/or text output reproduction data.

This makes it possible to selectively trigger the output of the output reproduction data so that it is only output in a command-controlled manner to those reproduction devices that have been previously configured by their users, for example, to support a visually impaired or blind person. This can be done, for example, in the course of installing an application/software intended for support. On the other hand, this can also be done at the operating system level, for example, if the operating system allows a setting with which a user can specify that he/she is visually impaired or even blind. It has therefore continued to be favourable that the reproduction device is designed, in principle or only after configuration, to issue a output-reproduction-data query command via the second short-range communication device for the purpose of initiating the reception of the output reproduction data.

However, visually impaired or blind persons can also be further supported in their shopping experience with the aid of the present invention. For example, it has also proven to be favourable that the output reproduction data comprises product-surroundings description data, which describes the product surroundings of the product and allows the reproduction device to acoustically reproduce the description of the product surroundings. The reproduction device is therefore preferably designed to receive product-surroundings description data, which describes the product surroundings of the product, as part of the output reproduction data or as a related reference in the output reproduction data.

This product-surroundings description data can also be provided in the same way as the two data structures discussed. They are used to describe the immediate vicinity of the display device, also including the surroundings of the product assigned to the display device, when they are acoustically reproduced by the reproduction device. For example, the user of the reproduction device can be told which products he can find on the left and right sides of the product currently in focus. This applies to the respective shelf level. However, this measure can also be used to describe the products on a shelf level above and/or below so that the visually impaired or even blind person can obtain an intuitive (acoustic) overview of the contents of the shelf in question on the basis of the product in question, for which the descriptive information has just been reproduced. The product queried via wireless short-range communication forms the central point of orientation for the further orientation of the person on the shelf.

In order to make it easier for the user of the reproduction device to take into account the acoustically described surroundings of the product, the reproduction device can be designed to reproduce the description, section by section, of the product's surroundings represented or referenced by means of the product-surroundings description data, in particular, as a result of the detection of user interaction. For example, the reproduction device can audibly communicate that there is another ABC-brand toothbrush below the product in question, such as a brand-XYZ toothbrush. Then the acoustic description of the surroundings pauses until, for example, the user utters the command "please continue", which is detected or recognized by the reproduction device and whereupon the reproduction device audibly communicates: "to the right of the product in question, there are toothpastes, and to the left of the product in question, the shelf containing oral hygiene products ends". After that, the reproduction device waits again for the command to continue the description of the surroundings. It should be mentioned here that the product-surroundings description data can of course also describe diagonally adjacent areas of the product in question so that this description of the surroundings can be made without gaps and the person is given a complete picture of the surroundings around the product in question in an acoustic manner. Furthermore, it can be provided that the description of the surroundings can be interrupted at any time by a spoken command, such as "enough" for example.

The user interaction was discussed here in the context of speech recognition, which as such is one of the standard features of common smartphones today and whose recognition results are used here for the purpose of the selective, i.e., section-by-section, reproduction of the appropriate information of the surroundings description. Of course, gesture recognition can also be used, which is particularly favourable if the person concerned not only has an impairment of vision but is also impaired in terms of speech ability or if this option is simply preferred.

Furthermore, gesture recognition can be used favourably in two ways in the context of the present invention. In accordance with a first embodiment of the reproduction device, a directional movement of the reproduction device can be detected with the aid of an acceleration sensor of the reproduction device and the detected direction can be used to select the acoustic reproduction of the description of the surroundings appropriate to this direction. In accordance with a second embodiment, an optical sensor (such as the camera system of the reproduction device) can be used to record and evaluate a person's gesture in order to obtain the directional information derived from it and to reproduce the description of the surroundings that corresponds to this direction.

Furthermore, it has proven to be extremely favourable that the display device is designed to recognize a directions query command that can be received in the course of wireless short-range communication, wherein the directions query command is used to query directions to another product, wherein the further product is characterized by product data contained in the directions query command. The directions query command originates from the reproduction device designed to output the directions query command through the second short-range communication device for the purpose of initiating the receipt of output reproduction data comprising directions description data.

The rest of the product can be communicated, for example, through a user interaction, such as a spoken question (e.g., "where are the organic bread rolls") or also a spoken command (e.g., "navigate me to the organic bread rolls"). In this context, the speech recognition of the reproduction device is also used to identify the further product and to obtain the product data representing the further product.

However, the other product can also be extracted from a shopping list digitally stored in the reproduction device, wherein, for example, the products listed there are processed sequentially (in order). The reproduction device may also comprise a thematic grouping of the shopping list (e.g., apples and pears belong to the fruit and vegetable group; ham and steak belong to the meat group), so the route information provided can convey a route optimized for the thematic groups for the person.

Favourably, after recognizing the directions query command, the display device is designed to provide directions description data comprising output reproduction data and to provide the directions description data via the short-range communication device, wherein the directions description data is intended for the acoustic reproduction of the description of the path to the further product at the reproduction device. Here, the idea is also taken into account that the output of the web description data should only be command-controlled, i.e., decidedly initiated by the reproduction device. This makes it possible to respond to the user's individual navigation preferences of the reproduction device.

In the present case, by analogy with the acoustic reproduction description of the product surroundings, the reproduction device can also be designed to reproduce, section by section, the description of the path to another product represented or referenced with the aid of the directions description data, in particular, as a result of the detection of a user interaction. This section-by-section reproduction allows the person who is impaired in terms of their eyesight or even blind to orientate themselves or move along the path without having to memorize the entire route from the start. So, the person is accompanied on their way with section navigation instructions.

This can be done in such a way that a first acoustic instruction tells the person, for example, to move to the end of the shelf to the right of him/her. Only when the person confirms the arrival at this collection point through user interaction (e.g., through speech: "I have arrived at the collection point") with the reproduction device, a second acoustic instruction is given, which causes the person to turn to the right into the shelf aisle that runs along there, and to follow the shelf aisle for eighteen steps.

In this case, technical or standardized measurements are deliberately not taken into account, because these could not be implemented during the movement of the person concerned. Rather, in the course of creating a user profile, the reproduction device can determine in advance how the average stride length of the person involved to be measured and then incorporate this knowledge into the person-specific measurement of the number of steps in order to enable the navigation instructions to be implemented as naturally as possible by the person in an surroundings specified by metric units, for example.

Only when the person confirms their arrival at this next point through user interaction with the reproduction device does a third acoustic instruction take place, informing the person that the other product can be found on the left shelf on the middle shelf level.

In order to obtain a precise orientation on the shelf in question, the person can bring his reproduction device into the radio range of a display device installed there in order to be informed acoustically about the product that is being described by means of the display device. Likewise, the acoustic description of the surroundings of this product, already discussed, can be made, which makes it easier to find the other product on the shelf in question.

The present invention enables a visually impaired or even blind person to obtain information about the products within his reach in a business premises by means of the display devices installed there. Furthermore, this person is even offered the opportunity to move "step by step", i.e., sequentially over easy-to-follow sections of the path leading to a (further) sought-after product. On the person's side, commercially available and widely used smartphones or tablet computers are used as user devices (in the sense of the reproduction device), which use the ESLs in the business premises for the purpose of acoustic information reproduction.

However, the present invention can also be used to verify the effectiveness of marketing measures in relation to the data subject. For example, the output reproduction data can also be used to send marketing or advertising messages that are which is determined in order to boost the sale of certain products. Since, in the course of wireless short-range communication, the identity of the reproduction device, possibly even the identity of the person, can also be determined, which can be communicated in the ESL system to the central control device and stored there for administrative purposes, it can also be checked when paying the invoice at the POS terminal whether the person has used the marketing or advertising message to purchase the product advertised with it.

At this point, it should be mentioned that the sequential order of commands transmitted to the display device described above does not have to be followed. Rather, the commands described can be transmitted individually and independently of each other to the display device and can be processed individually by the display device. Thus, for example, a query can be made for any ESL to clarify the surrounding products so that the output reproduction data can only contain the product-surroundings description data. Furthermore, a description of the route to the next product can be queried independently of a query of a specific product information or also the query of the surroundings of this product so that the output reproduction data can only show the product-surroundings description data. The commands are therefore available independently of each other in both in the case of reproduction device as well as in the case of the display device.

In summary, it should be mentioned at this point that the term "product information" is to be used as follows, depending on the circumstances:

- the information relates to the product whose ESL is currently being requested in a wireless short-range communication;
- information about the surroundings of the product whose ESL is currently being requested in a wireless short-range communication;
- the information relates to the path starting from the product whose ESL is currently being queried in a wireless short-range communication to another product.

Finally, it should be mentioned in general terms that the electronic devices discussed (ESLs, smartphones, tablet computers, video shelving rails, etc.) or their modules naturally comprise electronics. The electronics can be discrete or integrated electronics, or also a combination of both. Microcomputers, micro-controllers, application-specific integrated circuits (ASICs), possibly in combination with analogue or digital electronic peripherals, can also be used. Many of the mentioned functionalities of the devices are implemented—possibly in interaction with hardware components—with the aid of software that is executed on an electronics processor. Devices designed for radio communication usually comprise an antenna configuration for transmitting and receiving radio signals as part of a transceiver module. For wireless short-range communication, in addition to the antenna configuration mentioned above, a coil configuration for inductive coupling or a capacitor plate configuration can also be used. The electronic devices may also comprise an internal electrical power supply, which can be achieved, for example, with a replaceable or rechargeable battery. The devices can also be supplied wired, either by an external power supply or also by means of "Power over LAN".

These and other aspects of the invention emerge from the figures discussed below.

BRIEF DESCRIPTION OF THE FIGURES

The invention is explained in more detail below with reference to the attached figures on the basis of exemplary embodiments, to which, however, the invention is not limited. Thereby, identical components in the various figures are provided with identical reference numbers. The figures schematically show.

DESCRIPTION OF THE EXEMPLARY EMBODIMENTS

Figure 1:
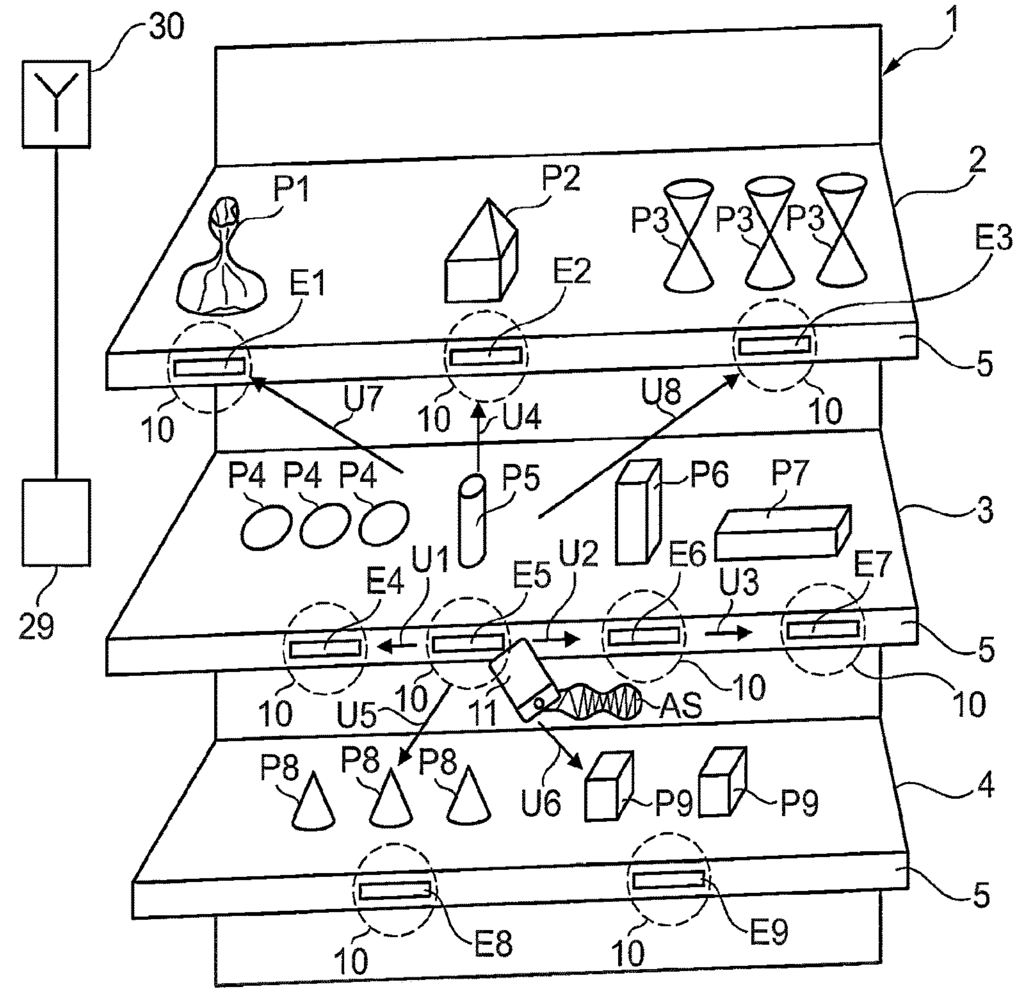
FIG. 1 a shelf with ESLs discussing two aspects of the invention.

FIG. 1 shows shelf 1 with three shelves, namely an upper shelf 2, a middle shelf 3 and the lower shelf 4, each of which is terminated at its front edge by a shelving rail 5. Shelves 2-4 contain different products P1-P9, which in the present case can be distinguished by their shapes. Corresponding to the positions of products P1 to P9, electronic shelf displays E1-E9, ESLs E1-E9 for short (referred to as "Electronic Shelf Labels" according to the first letters of the English labels) are attached to shelving rails 5 as display devices. Furthermore, FIG. 1 shows a central server 29 that manages the ESLs E1-E9. The server 29 is wired to an access point 30. The access point 30 provides an ESL wireless network for radio communication with ESLs E1-E9.

Figure 2:
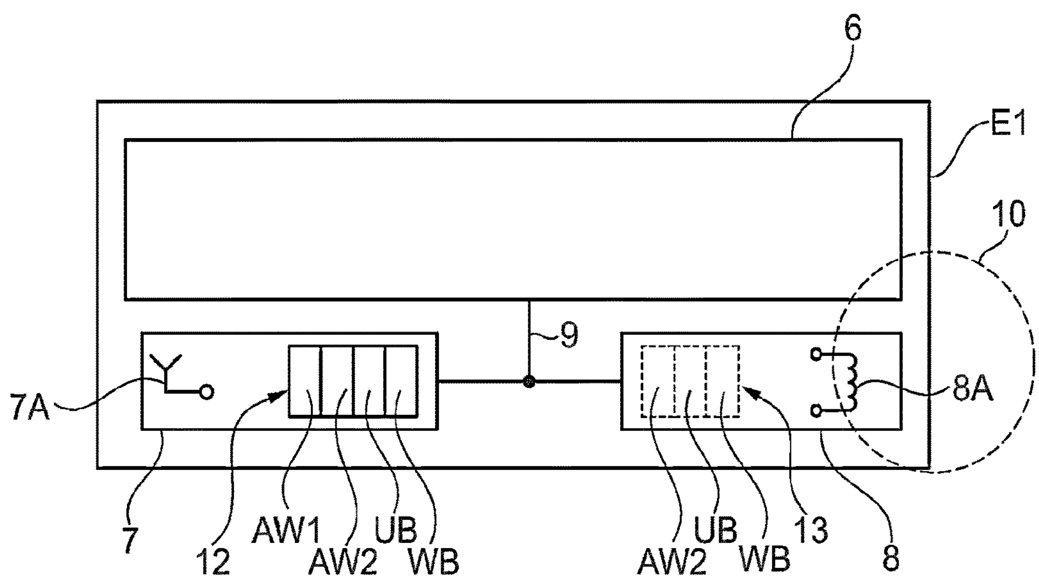
FIG. 2 a block diagram of the ESLs attached to the shelf.

FIG. 2 shows the first ESL E1, or more precisely its electronic block diagram, as a representative of the entirety of the installed ESLs E1-E9, wherein in the description of FIG. 2 only the abbreviation ESL is used with the omission of the reference number E1.

The ESL comprises an electrophoretic display module 6 designed for the energy-saving visual reproduction of price and/or product information of one of the products P1-P9.

The ESL E1 also comprises a first radio module 7, which is designed and intended for ESL radio communication in an ESL radio network listed in the general description. The ESL radio communication of the first radio module is based on the propagation of electromagnetic waves, which is why an antenna configuration 7A is indicated in the first radio module 7 as an interface between the electronics (not shown in detail) of the first radio module 7 and the surroundings. Via the ESL wireless network, the ESL obtains AW1 display-reproduction data, which represents the price and/or product information of the respective product P1-P9. In the present case, those display-reproduction data AW are formed by image files comprising digitally encoded image information which is transmitted to the display module 6 via an internal data bus 9 and is visually reproduced by it by means of its electrophoretic screen (not shown in detail).

The ESL also comprises a second radio module 8, which is designed and designed for NFC radio communication with a device also equipped with NFC technology located in its immediate vicinity, at least within an NFC radio communication range 10 of usually a few centimetres. In the context of this discussion, the device is a smartphone 11 equipped with NFC technology (see FIGS. 1 and 3) as a reproduction device. NFC radio communication is based on inductive coupling with this other device, which is why a coil configuration 8A is indicated in the second radio module 8 as an interface between an electronics (not shown in detail) of the second radio module 8 and the surroundings.

At this point, it should be mentioned that the electronics of modules 6, 7, 8 each comprise a microcontroller or a microprocessor that provides the functionalities of the respective modules 6-8, possibly in interaction with other electronic components or assemblies. It should also be mentioned that a central control module can also be provided, which controls the interaction of the individual modules 6-8 with each other in a coordinated manner.

In order to make it easier for visually impaired or blind persons to shop in a shop where shelf 1 is located, the following data are also transmitted to the ESL in the course of the aforementioned ESL radio communication, namely:

Output reproduction data AW2, which describe the price and/or product information in general and in the present case are available as plain text (e.g., in the ACSII code) and are transmitted in the form of a text file to the respective ESL E1 to E9 and stored there for retrieval by a reproduction device. This textual description can be in the form "This product was plain flour packaged in a bag of 500 grams each" or also simply "Cake flour, bag of 500 grams each" in relation to the ESL E1 in the upper left corner. This facilitates and accelerates the transfer using NFC technology, because the amount of data is very small.

product-surroundings description data UB, which describes the surroundings of the respective product. Here, the embodiment also offers itself as textual information about the surroundings for problem-free transmission via NFC technology. With regard to the product P5, the textual description of the surroundings (indicated by the arrows U1-U8), which is stored in the fifth ELS E5, can be structured as follows, wherein, of course, instead of the placeholders <<product Pn>>, the actual product name is given and the actual number of list entries depends on the respective position of the product and its surroundings:

"Immediately adjacent to the left you will find the <<product P4>>" (see FIG. 1, arrow U1)

"Immediately adjacent to the right you will find the <<product P6>>" (see FIG. 1, arrow U2)

"To the right of the <<product P6>>you will find the <<product P7>>" (see FIG. 1 arrow U3)

"Immediately above you will find the <<product P2>>" (see FIG. 1, arrow U4)

"Below, diagonally to the left, you will find the <<product P8>>" (see FIG. 1, arrow U5)

"Below diagonally adjacent to the right you will find the <<product P9>>" (see figure, arrow U6)

"Above, diagonally to the left, you will find the <<product P1>>" (see FIG. 1, arrow U7)

"Above, diagonally to the right, you will find the <<product P3>>" (see FIG. 1, arrow U8)

The data AW1, AW2 and UB are stored in the ESL (see FIG. 2) in a storage stage 12 of the first radio module 7 and are available there for later use by the second radio module 8, i.e., they can be retrieved there. In order not to have to activate the first radio module 7 when accessing the data AW2 and UB, it can be favourable that the data AW2 and UB are transferred to the second radio module 8 after they have been received and stored there, as indicated by broken lines, in a second storage stage 13 of the second radio module 8. Optionally, the data AW2 and UB can also be stored in a common memory (not shown) to which both radio modules 7 and 8 have access.

In the case of NFC radio communication with the smartphone 11, the data AW2 and UB are retrieved by the ESL involved in the NFC communication (in the context of FIG. 1, this is the ESL E5) via the smartphone 11, where they are converted into audio signals AS and output acoustically. The visually impaired or even educated person can then orientate themselves on the shelf based on the acoustic description.

Figure 3:
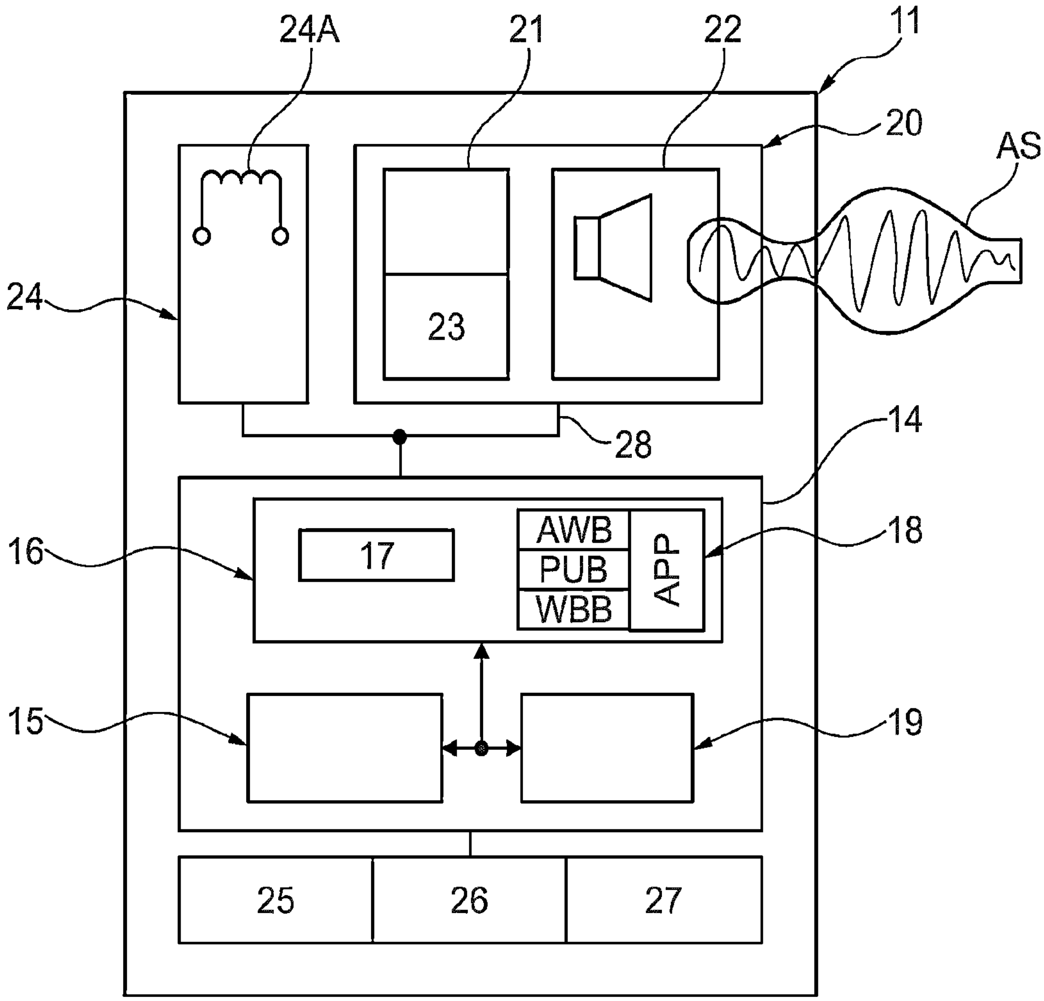
FIG. 3 a block diagram of a smartphone used as a reproduction device in the discussion of the invention.

The smartphone 11, which is used by the visually impaired person, is discussed below with the aid of FIG. 3. It comprises central electronics 14 which, in the present case, consist of a microcontroller 15 for processing programs (i.e., software), an E2PROM memory 16 for storing the operating system 17 and for storing a software application 18 installed for the application of the smartphone 11 at hand, as well as a RAM memory 19 for the temporary storage of data that occur during the processing of the program.

The smartphone 11 also comprises audio-visual interface electronics 20, which essentially consists of a touchscreen module 21 for visualizing information and receiving a user interaction in the sense of a touch on the screen, an audio module 22 (amplifier and loudspeakers) for outputting the audio signals AS and a microphone module 23 for receiving a user interaction in the sense of spoken words, etc.

Furthermore, the smartphone 11 comprises a third radio module 24, which is designed for NFC radio communication and is used in the present case for NFC communication with ESLs E1 to E9. Here, for the reasons mentioned in connection with the second radio module 8, a further coil configuration 24A is also indicated.

In addition, the smartphone 11 also comprises a power supply module 25, a cellular module 26 for communication in a cellular network of a mobile operator, and other common smartphone components 27, which have not been discussed in detail.

The blocks 24, 20 and 14 are connected by means of an internal data bus 28. However, they can also be integrated on a system-on-a-chip platform.

The software application 18 can be divided into the program code APP and the commands intended for data retrieval during NFC radio communication, which are also understood by ESLs E1 to E9. These commands in the present case are:

a output-reproduction-data query command AWB, which initiates the output of the output reproduction data to ESLs E1 to E9 for the purpose of acoustic reproduction of the price and/or product information on the smartphone 11, a PUB directions query command that initiates the output of output reproduction data comprising product-surroundings description data to ESLs E1 to E9 for the purpose of acoustically reproducing the description of a product's surroundings on the smartphone 11, and a directions query command WBB, which initiates the output of output reproduction data comprising directions description data to the ESLs E1 to E9 for the purpose of acoustic reproduction of the description of the route to another product on the smartphone 11, wherein the information about the further product is taken, for example, from an electronic shopping list, which can also be stored in the software application 18 in question, or from another software application of the smartphone 11.

If the smartphone 11 is now held by the person to the central ESLs E5 with the software application 18 started, as shown in FIG. 1, an NFC radio connection is first established and the output-reproduction-data query command AWB is transmitted to the ESLs E5, where it is recognized and, as a result, the text file stored there, which comprises the price and/or product information for the product P5, is detected by the ESL E5, transmitted to the smartphone 11 in the course of NFC radio communication. The text contained in the text file is converted into an audio format by the smartphone 11, for example, by the software application 18 and played back as the audio signal AS by means of the audio module 22.

The software application 18 now also offers the person the reference of surroundings information to the product P5. If the user confirms that he/she is also interested in this information, the PUB directions query command is transmitted to the ESL E5 in an NFC radio communication, recognized there and, as a result of the E SL E5, the text file stored there, which comprises the surroundings information (see the previous discussions on the product-surroundings description data UB) for the product P5, is transmitted to the smartphone 11 in the course of NFC radio communication. In the case of the smartphone 11, the text contained in the text file is converted into an audio format by the software application 18 and reproduced as the audio signal AS by means of the audio module 22. The audio reproduction can be stopped after the reproduction of each text sequence, i.e., the reproduction of the ambient information for one of the directions U1-U8, and voice-controlled reproduction can only be resumed after receiving a voice command, such as "please continue". This gives the person time to mentally classify the surroundings information received.

The software application 18 also offers the person the option of being navigated to another product acoustically. If the person confirms that this type of navigation is desired, the next product (referred to as another product) is selected from an electronic shopping list and the associated product information (e.g., the product name as text) is transmitted as part of the directions query command WBB in an NFC radio communication to the ESLs E5, where the command is recognized. As a consequence of recognizing this command, the ESL E5 now contacts the central server 29 of the ESL system (not shown; referred to in the general description as the central control device) via its first radio module 7, wherein the identity of the ESL E5 and the additional product to be searched are communicated. The server 29 comprises a digitally stored planogram from which the positions of all products in the business premises and, as a consequence, the positions of all ESLs assigned to these products can also be retrieved. From this, a path through the store from the current position of the ESL E5 to the other product, which can be located a long distance away in another aisle, is calculated and transmitted as directions description data WB in the form of text sequences that sequentially describe the path from collection point to collection point to the ESL E5 via the first radio module 7, where applicable, it is temporarily stored there, and from there transmitted to the smartphone 11 via the second radio module 8. In the case of the smartphone 11, the text is now converted into synthesized speech again, wherein the reproduction of the navigation instructions (i.e., the individual instruction sequences) is triggered sequentially from collection point to collection point in order to give the person sufficient time to orientate themselves and move between the collection points stress-free.

The present invention thus enables the intuitively retrievable acoustic provision of local information on products on a shelf as well as the acoustically guided navigation in a business premises, wherein the infrastructure of the ESLs in the business premises forms the basis for a reliable and error-free provision of these functionalities. Since the positions of the installed ESLs are always known in the ESL system, the person can restart the acoustically guided navigation process at any time with any ESL, i.e., even if the person has accidentally strayed from the acoustically specified path, i.e., has lost his way. This ensures security and confidence in the application of this technology.

Ultimately, it is pointed out once again that the figures described in detail above are only exemplary embodiments, which can be modified by the person skilled in the art in various ways without leaving the scope of the invention. For the sake of completeness, it is also pointed out that the use of the indefinite article "a" does not exclude that the respective features can also be present a multiple of times.

The invention claimed is:

1. An electronic price and/or product-information display device, a display device for short, which is designed to visually reproduce first price and/or product information of a product and which is designed to store reproduction data, said reproduction data representing the first price and/or product information and second price and/or product information of one or more products surrounding the product that are different from the product, wherein the display device comprises a first short-range communication device, which is designed for wireless short-range communication with a reproduction device, characterized in that the reproduction data comprise display-reproduction data, which are determined in order to visually reproduce the first price and/or product information by means of the electronic price and/or product display device itself, and output reproduction data which allows for output by means of the wireless short-range communication to the reproduction device and allows for acoustic reproduction of the first price and/or product information and the second price and/or product information at the reproduction device, and that the first short-range communication device has access to the output reproduction data and is designed to output the output reproduction data in the course of the wireless short-range communication.

2. The display device according to claim 1, comprising a system communication device which differs from the first short-range communication device and is which is provided in order to communicate with a control device used to provide the reproduction data, wherein the output reproduction data is obtained by means of the system communication device and is stored in a storage stage of the display device.

3. The display device according to claim 1, which is designed to recognize a output-reproduction-data query command that can be received in the course of the wireless short-range communication, and to also distinguish it from at least one other query command where applicable, and to transmit the output reproduction data only after the output-reproduction-data query command has been recognized by means of the wireless short-range communication.

4. The display device according to claim 1, which is designed to recognize a directions query command that can be received in the course of the wireless short-range communication, wherein the directions query command is used to query directions to another product, wherein the another product is characterized by product data contained in the directions query command.

5. The display device according to claim 4, which, after recognizing the Directions Query Command, is designed to provide additional output reproduction data comprising directions description data and to provide the directions description data via the first short-range communication device, wherein the directions description data are determined with the reproduction device for the acoustic reproduction of a description of a path to the another product.

6. The display device according to claim 5, having a system communication device which differs from the first short-range communication device and which is provided in order to communicate with a control device used to provide the display-reproduction data, the output reproduction data, and the additional output reproduction data, wherein the output reproduction data is and the additional output reproduction data are obtained by means of the system communication device and are stored in a storage stage of the display device, wherein the display device is designed to query the additional output reproduction data comprising the directions description data from the control device with disclosure of the product data of the another product.

7. The display device according to claim 1, wherein the first short-range communication device is a first near-field communication device, NFC device for short, and the reproduction device is NFC-compatible.

8. The display device according to claim 1, wherein the output reproduction data is in the form of audio and/or text reproduction data.

9. A reproduction device which comprises:

a reproduction stage designed for the acoustic reproduction of digitally represented information, a second short-range communication device, which is provided for wireless short-range communication with an electronic price and/or product-information display device, a display device for short, and characterized in that the second short-range communication device is designed for querying and receiving output reproduction data in the course of the wireless short-range communication with the electronic price and/or product-information display device, wherein the output reproduction data in the reproduction device allows first price and/or product information and second price and/or product information to be reproduced acoustically, wherein the first price and/or product information is of a product corresponding with the display device and the second price and/or product information is of one or more products surrounding the product that are different from the product, and the second short-range communication device for the provision of the output reproduction data, is designed for the acoustic reproduction of the first price and/or product information and the second price and/or product information by the reproduction stage.

10. The reproduction device according to claim 9, wherein the reproduction stage is designed for direct reproduction of audio reproduction data represented by the output reproduction data.

11. The reproduction device according to claim 9, wherein the reproduction device is designed to convert text reproduction data represented by the output reproduction data into audio reproduction data, and the reproduction stage is designed to directly reproduce the audio reproduction data obtained thereby.

12. The reproduction device according to claim 9, which is designed to output an output-reproduction-data query command via the second short-range communication device for the purpose of initiating the reception of the output reproduction data.

13. The reproduction device according to claim 8 which is designed to reproduce, section by section, a description of product surroundings of the product represented or referenced by means of product-surroundings description data.

14. The reproduction device according to claim 9 which is designed to output a directions query command via the second short-range communication device for the purpose of initiating the reception of additional output reproduction data comprising directions description data.

15. The reproduction device according to claim 14 which is designed to reproduce, section by section, a description of a path to a further product represented or referenced by means of the directions description data.

16. The reproduction device according to claim 14 which is designed to reproduce, section by section, a description of a path to a further product represented or referenced by means of the directions description data as a result of a detection of a user interaction.

17. The reproduction device according to claim 9, wherein the second short-range communication device is a second near-field communication device, NFC device for short, and the display device is NFC-compatible.

18. The reproduction device according to claim 9, wherein the output reproduction data is in the form of audio and/or text reproduction data.

19. The reproduction device according to claim 9 which is designed to reproduce, section by section, a description of product surroundings of the product represented or referenced by means of product-surroundings description data as a result of a detection of a user interaction.

* * * * *